(12) United States Patent
Fukuyama et al.

(10) Patent No.: US 9,404,412 B2
(45) Date of Patent: Aug. 2, 2016

(54) TWO-STROKE ENGINE AND FOUR-STROKE ENGINE

(75) Inventors: Masahisa Fukuyama, Osaka (JP); Kenji Ishiguro, Osaka (JP); Naohiro Murata, Osaka (JP)

(73) Assignee: HITACHI ZOSEN CORPORATION (JP)

( * ) Notice: Subject to any disclaimer, the term of this patent is extended or adjusted under 35 U.S.C. 154(b) by 0 days.

(21) Appl. No.: 13/991,272

(22) PCT Filed: Dec. 5, 2011

(86) PCT No.: PCT/JP2011/078050
§ 371 (c)(1),
(2), (4) Date: Jun. 3, 2013

(87) PCT Pub. No.: WO2012/077627
PCT Pub. Date: Jun. 14, 2012

(65) Prior Publication Data
US 2013/0247885 A1  Sep. 26, 2013

(30) Foreign Application Priority Data
Dec. 9, 2010  (JP) ................................ P2010-274547

(51) Int. Cl.
| | |
|---|---|
| *F02B 25/00* | (2006.01) |
| *F02B 13/00* | (2006.01) |
| *F02B 33/00* | (2006.01) |
| *F02M 69/04* | (2006.01) |
| *F02B 25/04* | (2006.01) |

(Continued)

(52) U.S. Cl.
CPC ................. *F02B 33/00* (2013.01); *F02B 25/04* (2013.01); *F02B 47/04* (2013.01); *F02D 19/024* (2013.01);
(Continued)

(58) Field of Classification Search
CPC ...... F02B 25/04; F02B 29/0406; F02B 37/00; F02M 25/0709; F02M 21/0206; F02M 25/0742; F02M 21/0275; F02M 25/071; Y02T 10/121; Y02T 10/32
USPC ....................................... 123/65 E, 559.2, 445
See application file for complete search history.

(56) References Cited

U.S. PATENT DOCUMENTS

| | | | | |
|---|---|---|---|---|
| 2,645,214 A | * | 7/1953 | Birnstiel | ................... 123/74 AE |
| 6,182,449 B1 | | 2/2001 | Halimi et al. | ................... 60/612 |

(Continued)

FOREIGN PATENT DOCUMENTS

| | | |
|---|---|---|
| CN | 1204382 A | 1/1999 |
| CN | 1472425 A | 2/2004 |

(Continued)

OTHER PUBLICATIONS

English translation of European Patent Application No. 0527362 A1 (8 pages), Feb. 1993.

(Continued)

*Primary Examiner* — Lindsay Low
*Assistant Examiner* — Syed O Hasan
(74) *Attorney, Agent, or Firm* — Ostrolenk Faber LLP

(57) ABSTRACT

A two-stroke engine (1) includes a cylinder (2) having a scavenging port (23) and an exhaust port (24), a piston (3) provided in the cylinder (2), a first ejection part (61) for ejecting liquid ammonia into a combustion chamber (20), and a supercharger (5) for pressurizing a suction gas to generate a scavenging gas. In the two-stroke engine (1), the first ejection part (61) ejects liquid ammonia into the combustion chamber (20) within a period of time from when supply of the scavenging gas through the scavenging port (23) into the combustion chamber (20) is started until when the piston (3) next reaches top dead center. It is thus possible to reduce the temperature of gas within the combustion chamber (20) by the heat of vaporization of the liquid ammonia, reduce the pressure in the combustion chamber (20) during compression, and reduce the amount of compression work.

21 Claims, 6 Drawing Sheets

(51) Int. Cl.
  *F02B 47/04* (2006.01)
  *F02D 19/06* (2006.01)
  *F02M 21/02* (2006.01)
  *F02D 19/02* (2006.01)
  *F02B 37/00* (2006.01)
  *F02B 29/04* (2006.01)
  *F01N 3/20* (2006.01)
  *F02B 75/02* (2006.01)

(52) U.S. Cl.
  CPC ....... *F02D 19/0644* (2013.01); *F02M 21/0206* (2013.01); *F02M 21/0275* (2013.01); *F02M 21/0284* (2013.01); *F02M 21/0287* (2013.01); *F01N 3/2066* (2013.01); *F02B 29/0406* (2013.01); *F02B 37/00* (2013.01); *F02B 2075/025* (2013.01); *Y02T 10/121* (2013.01); *Y02T 10/32* (2013.01); *Y02T 10/36* (2013.01)

(56) References Cited

U.S. PATENT DOCUMENTS

| | | | |
|---|---|---|---|
| 6,679,200 B2 * | 1/2004 | Dingle | 123/1 A |
| 2010/0288211 A1 * | 11/2010 | Agosta | 123/3 |
| 2010/0288249 A1 * | 11/2010 | Sasaki et al. | 123/575 |
| 2011/0265463 A1 | 11/2011 | Kojima et al. | |

FOREIGN PATENT DOCUMENTS

| | | |
|---|---|---|
| EP | 1 380 737 A1 | 1/2004 |
| JP | 55-104513 | 8/1980 |
| JP | 63-186936 | 11/1988 |
| JP | 01-318716 | 12/1989 |
| JP | 5-195801 | 8/1993 |
| JP | 5-332152 | 12/1993 |
| JP | 2006-183482 | 7/2006 |
| JP | 2010-159705 | 7/2010 |
| WO | EP 0 875 671 A1 | 11/1998 |
| WO | WO 2010/104985 A2 | 9/2010 |
| WO | EP 2 565 437 A1 | 3/2013 |

OTHER PUBLICATIONS

PCT/IB/326 Notification Concerning, Transmittal of International Preliminary Report on Patentability including PCT/IB/373 and PCT/ISA/237 (in Japanese) 6 pages, Jun. 2013.

PCT/IB/338 Notification of Transmittal of Translation of the International Preliminary Report on Patentability including PCT/IB/373 and PCT ISA/237 (in english) 7 pages, Dec. 2011.

Extended European Search Report dated Aug. 28, 2015 in corresponding European Patent Application No. 11 846 690.3.

* cited by examiner

TWO-STROKE ENGINE AND FOUR-STROKE ENGINE

CROSS-REFERENCE TO RELATED APPLICATIONS

The present application is a 35 U.S.C. §§371 national phase conversion of PCT/JP2011/078050, filed Dec. 5, 2011, which claims priority to Japanese Patent Application No. P2010-274547, filed Dec. 9, 2010, the contents of which are incorporated herein by reference. The PCT International Application was published in the Japanese language.

TECHNICAL FIELD

The present invention relates to an engine including a supercharger.

BACKGROUND ART

Engines that burn ammonia gas have conventionally been proposed. For example, Japanese Patent Application Laid-Open No. 5-332152 discloses a technique for decomposing ammonia gas into hydrogen and nitrogen by the heat of exhaust gas from a combustion chamber and using the above hydrogen gas to efficiently burn ammonia gas that is separately supplied into the combustion chamber. Japanese Patent Application Laid-Open No. 2010-159705 discloses a technique used in an ammonia-burning internal combustion engine in which the latent heat of vaporization of liquid ammonia ejected into an intake port of a cylinder is used to reduce the temperature of intake air supplied into the combustion chamber.

Incidentally, there is a constant demand for improving energy efficiency in various types of engines. With engines including a cylinder and a piston, a reduction in the amount of work in a compression stroke contributes greatly to improving energy efficiency. However, with engines provided with a supercharger, high-pressure air compressed by the supercharger is supplied to the cylinder and causes an increase in the amount of compression work.

SUMMARY OF INVENTION

The present invention is intended for a two-stroke engine, and it is an object of the present invention to reduce the amount of compression work in the engine.

The two-stroke engine according to the present invention includes a cylinder, a piston provided in the cylinder, a supercharger for pressurizing a suction gas to generate a scavenging gas, a scavenging port formed in the cylinder and for supplying the scavenging gas from the supercharger into a combustion chamber that is a space enclosed by the cylinder and an upper surface of the piston, an exhaust port formed in the cylinder and for exhausting gas within the combustion chamber out of the combustion chamber, and an ejection part for ejecting liquid ammonia into the combustion chamber within a period of time from when supply of the scavenging gas through the scavenging port into the combustion chamber is started until when the piston next reaches top dead center.

According to the present invention, it is possible to reduce the temperature of the gas within the combustion chamber by the heat of vaporization of the liquid ammonia, reduce the pressure in the combustion chamber during compression, and reduce the amount of compression work.

In a preferred embodiment of the present invention, the scavenging port and the ejection part are provided in a lower portion of the cylinder. The scavenging gas is thus directly cooled at the time of inflow. This makes it possible to further reduce the amount of compression work.

In another preferred embodiment of the present invention, the two-stroke engine further includes a reduction catalyst for, along with ammonia gas, reducing nitrogen oxide. The reduction catalyst is provided on a path of the exhaust gas exhausted from the combustion chamber, and the ejection part ejects the liquid ammonia into the combustion chamber within a period of time during which the gas within the combustion chamber is being exhausted through the exhaust port.

In an aspect of the present invention, a part of burnt gas remains as residual gas in the combustion chamber when the exhaust port is closed, and the ejection part ejects the liquid ammonia into the combustion chamber after the exhaust port is closed. It is thus possible to reduce the amount of compression work while reducing nitrogen oxide in the exhaust gas.

In another aspect of the present invention, the two-stroke engine further includes another ejection part for, when the piston is positioned in a vicinity of the top dead center, ejecting fluid including ammonia into the combustion chamber to cause combustion of gas in the combustion chamber. In this case, more preferably, the ejection part serves as the other ejection part. The structure of the two-stroke engine can thus be simplified.

The structure of the two-stroke engine can also be simplified by supplying the scavenging gas from the supercharger to the scavenging port without cooling the scavenging gas by a cooling medium.

The present invention is also intended for a four-stroke engine. The four-stroke engine includes a cylinder, a piston provided in the cylinder, a supercharger for pressurizing a suction gas to generate an intake gas, an intake port formed in the cylinder and for supplying the intake gas from the supercharger into a combustion chamber in an intake stroke, the combustion chamber being a space enclosed by the cylinder and an upper surface of the piston, an ejection part for ejecting liquid ammonia into the combustion chamber within a period of time from when supply of the intake gas through the intake port into the combustion chamber is started until when the piston reaches top dead center in a compression stroke, and an exhaust port formed in the cylinder and for exhausting gas in the combustion chamber out of the combustion chamber in an exhaust stroke performed after an expansion stroke in which the gas within the combustion chamber burns. It is thus possible to reduce the temperature of the gas in the combustion chamber by the heat of vaporization of the liquid ammonia, reduce the pressure in the combustion chamber during compression, and reduce the amount of compression work.

These and other objects, features, aspects and advantages of the present invention will become more apparent from the following detailed description of the present invention when taken in conjunction with the accompanying drawings.

DESCRIPTION OF EMBODIMENTS

Figure 1:
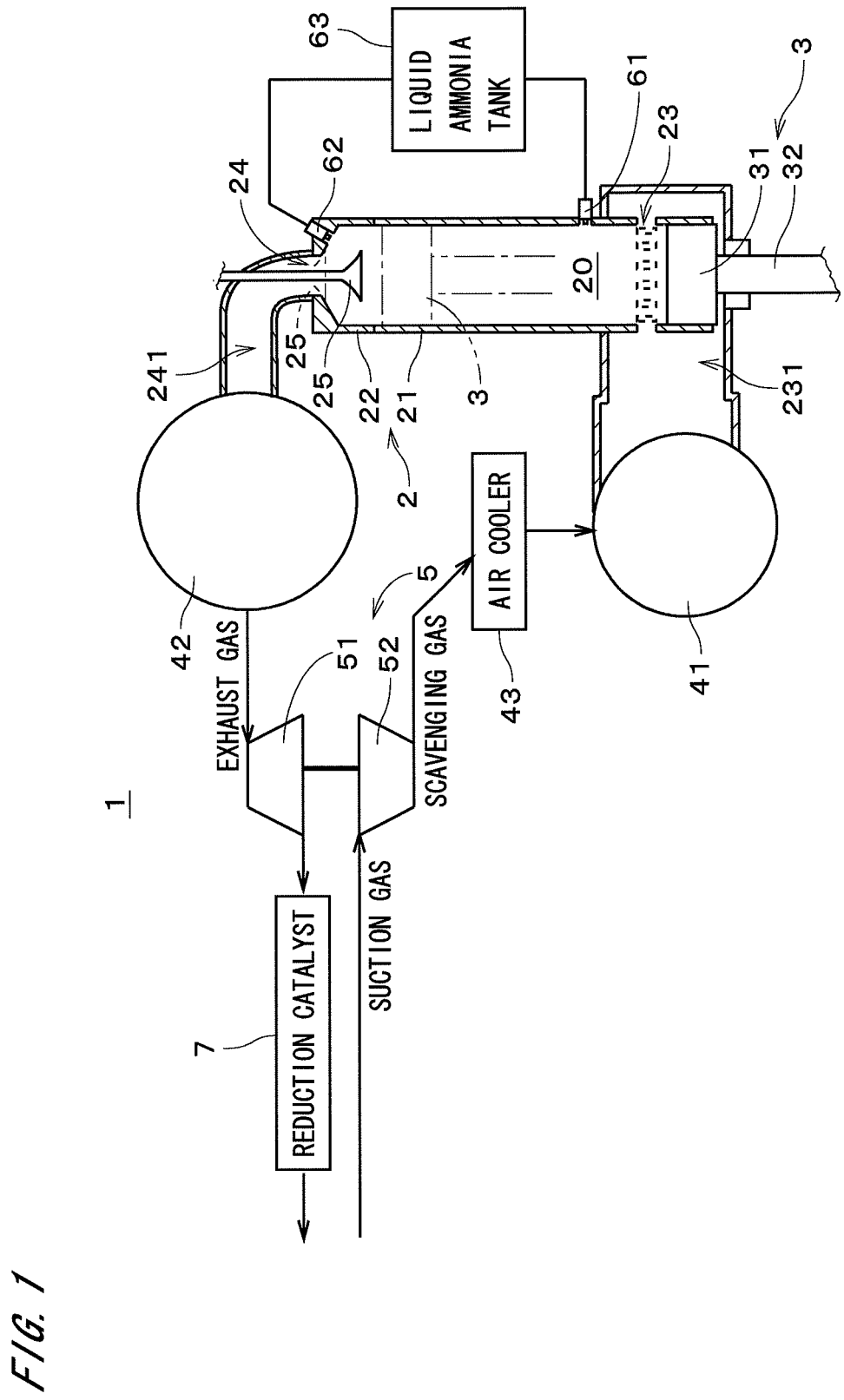
FIG. 1 illustrates a configuration of a two-stroke engine according to a first embodiment.

FIG. 1 illustrates a configuration of a two-stroke engine 1 according to a first embodiment of the present invention. The two-stroke engine 1 in FIG. 1 is a marine internal combustion engine and uses ammonia gas as primary fuel. The two-stroke engine 1 includes a cylinder 2 and a piston 3 provided in the cylinder 2. The piston 3 is movable in the vertical direction in FIG. 1. Note that the vertical direction in FIG. 1 is not necessarily the direction of gravity.

The cylinder 2 has a cylindrical cylinder liner 21 and a cylinder cover 22 attached to the top of the cylinder liner 21. A large number of through holes are circumferentially arranged in the vicinity of a lower end portion of the cylinder liner 21, and a cluster of these through holes constitute a scavenging port 23 for supplying a scavenging gas described later into the cylinder 2. A scavenging chamber 231 is provided around the scavenging port 23, and the scavenging port 23 communicates with a scavenging pipe 41 through the scavenging chamber 231.

The cylinder cover 22 has an exhaust port 24 for exhausting gas within the cylinder 2 out of the cylinder 2. The exhaust port 24 is provided with an exhaust valve 25 that opens and closes the exhaust port 24. The gas exhausted through the exhaust port 24 out of the cylinder 2 (hereinafter, referred to as "exhaust gas") is guided through an exhaust path 241 to an exhaust pipe 42. The actual two-stroke engine 1 includes a plurality of cylinders 2, and the cylinders 2 are connected to a single scavenging pipe 41 and a single exhaust pipe 42.

The two-stroke engine 1 further includes a supercharger 5 that is a turbocharger and an air cooler 43 that cools air supplied from the supercharger 5 by a cooling medium such as sea water. The exhaust gas in the exhaust pipe 42 is sent to a turbine 51 of the supercharger 5. The exhaust gas that is used to rotate the turbine 51 is exhausted out of the two-stroke engine 1 via a reduction catalyst 7 for reducing nitrogen oxide ($NO_x$). A compressor 52 of the supercharger 5 uses rotary power generated by the turbine 51 to pressurize a suction gas (air) taken in from outside of the two-stroke engine 1. The compressed air (hereinafter, referred to as "scavenging gas") is cooled by the air cooler 43 and then supplied into the scavenging pipe 41. In this way, the supercharger 5 generates a scavenging gas by pressurizing the suction gas using the exhaust gas.

The piston 3 includes a thick disk-shaped piston crown 31 inserted in the cylinder liner 21, and a piston rod 32 having one end connected to the bottom surface of the piston crown 31. The other end of the piston rod 32 is connected to a crank mechanism not shown. In the two-stroke engine 1 in FIG. 1, the space enclosed by the cylinder liner 21, the cylinder cover 22, the exhaust valve 25, and the upper surface of the piston crown 31 forms a combustion chamber 20 for burning ammonia gas and air.

The two-stroke engine 1 further includes a first ejection part 61 and a second ejection part 62 both for ejecting liquid ammonia into the combustion chamber 20. The first ejection part 61 is disposed in a lower portion of the cylinder liner 21 (specifically, the lower half of a range in which the upper surface of the piston crown 31 passes through in one stroke of the piston 3 from top dead center to bottom dead center), and more specifically, in the vicinity of the scavenging port 23. The second ejection part 62 is disposed in the cylinder cover 22. The first ejection part 61 and the second ejection part 62 are connected to a liquid ammonia tank 63. Note that the first ejection part 61 is housed in a recessed portion formed in the inner surface of the cylinder liner 21 and thus does not interfere with the movement of the piston crown 31.

Figure 2:
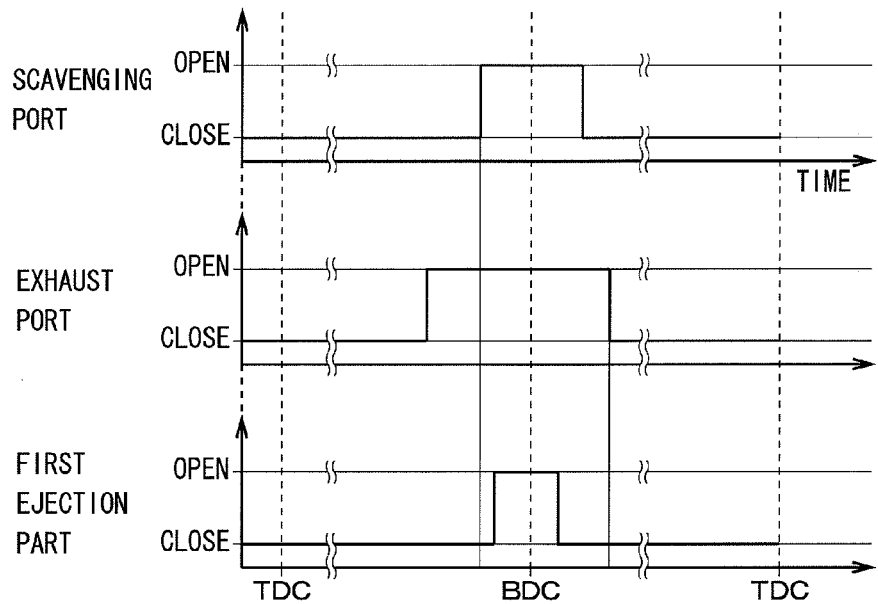
FIG. 2 is a timing chart illustrating opening and closing operations of a scavenging port, an exhaust port, and a first ejection part.

Next is a description of operations of the two-stroke engine 1. FIG. 2 is a timing chart illustrating opening and closing operations of the scavenging port 23, the exhaust port 24, and the first ejection part 61. In the two-stroke engine 1 illustrated in FIG. 1, the position of the piston 3 indicated by dashed double-dotted lines is the top dead center, and the position of the piston 3 indicated by solid lines is the bottom dead center. In FIG. 2, the time at which the piston 3 is positioned at the top dead center is denoted by "TDC," and the time at which the piston 3 is positioned at the bottom dead center is denoted by "BDC" (the same applies to FIGS. 4 and 5, which are described later). The horizontal axis in FIG. 2 can also be taken as indicating the crank angle in the aforementioned crank mechanism.

In the two-stroke engine 1, when the piston 3 is positioned in the vicinity of the top dead center, the exhaust valve 25 moves upward as indicated by the dashed double-dotted lines in FIG. 1 so that the exhaust port 24 is closed and gas (scavenging gas and ammonia gas as described later) within the combustion chamber 20 are compressed. The second ejection part 62 ejects liquid ammonia into the combustion chamber 20, and accordingly vaporized ammonia ignites spontaneously, causing combustion (expansion) of the gas in the combustion chamber 20. This causes the piston 3 to be pushed down toward the bottom dead center. Note that the gas within the combustion chamber 20 does not necessarily have to ignite spontaneously, and the ignition of the gas in the combustion chamber 20 may be caused by a spark plug or the like.

After the combustion of gas in the combustion chamber 20, the exhaust valve 25 moves downward to open the exhaust port 24 before the piston 3 reaches the bottom dead center (see the middle section in FIG. 2). This starts exhaust of burnt gas in the combustion chamber 20. The gas exhausted from the combustion chamber 20 (e.g., "exhaust gas") is, as described previously, sent through the exhaust path 241 and the exhaust pipe 42 to the turbine 51 of the supercharger 5 and is exhausted out of the two-stroke engine 1 after passing through the reduction catalyst 7. In the two-stroke engine 1, a cam mechanism connected to a crank shaft of the crank mechanism causes the exhaust valve 25 to move up and down (i.e., causes the exhaust port 24 to be opened or closed).

When the piston 3 has moved to the vicinity of the bottom dead center and the upper surface of the piston crown 31 is positioned below the scavenging port 23, the combustion chamber 20 communicates with the scavenging chamber 231. In other words, the scavenging port 23 is opened to start the supply of the scavenging gas within the scavenging chamber 231 into the combustion chamber 20 as shown in the upper section in FIG. 2. Then, the first ejection part 61 starts ejecting liquid ammonia (i.e., the first ejection part 61 is opened) as shown in the lower section in FIG. 2. The liquid ammonia emitted into the combustion chamber 20 is immediately vaporized and accordingly gaseous ammonia (ammonia gas) is mixed into the scavenging gas.

At this time, the scavenging gas within the combustion chamber 20 is cooled by the heat of vaporization (latent heat of vaporization) of the liquid ammonia. Part of the scavenging gas within the combustion chamber 20 and part of ammonia gas obtained by vaporization of the liquid ammonia immediately reach the exhaust port 24 and are exhausted from the combustion chamber 20. In other words, part of the scavenging gas and part of the ammonia gas pass through the combustion chamber 20. The exhaust gas including the ammonia gas thus reaches the reduction catalyst 7 through the exhaust pipe 42 and the turbine 51, and nitrogen oxide in the exhaust gas is reduced with the ammonia gas and the reduction catalyst 7.

The piston 3 that has passed through the bottom dead center changes to move upward, and the first ejection part 61 continues to eject liquid ammonia until immediately after the change to the upward movement of the piston 3. Since the upper surface of the piston crown 31 has reached above the scavenging port 23 after the first ejection part 61 stopped ejecting liquid ammonia (i.e., after the first ejection part 61 was closed), the scavenging port 23 is closed and the supply of the scavenging gas into the combustion chamber 20 is stopped. Then, the exhaust port 24 is closed with the exhaust valve 25 and the combustion chamber 20 is sealed. The piston 3 further moves upward so that the scavenging gas and the ammonia gas within the combustion chamber 20 are compressed, and when the piston 3 reaches in the vicinity of the top dead center, the second ejection part 62 ejects liquid ammonia into the combustion chamber 20, causing combustion in the combustion chamber 20. The two-stroke engine 1 repeats the above-described operations.

As described above, in the two-stroke engine 1 in FIG. 1, the first ejection part 61 ejects liquid ammonia into the combustion chamber 20 within a period of time from when the supply of the scavenging gas through the scavenging port 23 into the combustion chamber 20 is started until when the piston 3 next reaches the top dead center (i.e., until when the compression stroke is completed, but not including the time at which the compression stroke is completed). It is thus possible in the two-stroke engine 1 to reduce the temperature of the gas (mainly the scavenging gas) within the combustion chamber 20 by the heat of vaporization of the liquid ammonia, reduce the pressure in combustion chamber 20 during compression, and reduce the amount of compression work. Consequently, the two-stroke engine 1 can achieve improved energy efficiency.

In the two-stroke engine 1, the scavenging port 23 and the first ejection part 61 are disposed in a lower portion of the cylinder 2, and the ejection of liquid ammonia into the combustion chamber 20 is started immediately after the start of supply of the scavenging gas into the combustion chamber 20. This enables the scavenging gas to be directly cooled at the time of inflow, making it possible to reduce the pressure in the combustion chamber 20 from the beginning of the compression stroke and to further reduce the amount of compression work.

In the two-stroke engine 1, the reduction catalyst 7 that, along with the ammonia gas, reduces nitrogen oxide is further provided on the path of the exhaust gas exhausted from the combustion chamber 20, and the first ejection part 61 ejects liquid ammonia into the combustion chamber 20 while the gas within the combustion chamber 20 is being exhausted through the exhaust port 24. The ammonia gas used to cool the scavenging gas can thus be guided in an unburnt state to the reduction catalyst 7, and nitrogen oxide in the exhaust gas can be appropriately reduced with the reduction catalyst 7 and the ammonia gas. Note that the path of the exhaust gas in the two-stroke engine 1 ranges from the exhaust path 241 to the site at which the exhaust gas is discharged into the atmosphere, and the reduction catalyst 7 may be disposed at any site on the path of the exhaust gas.

Figure 3:
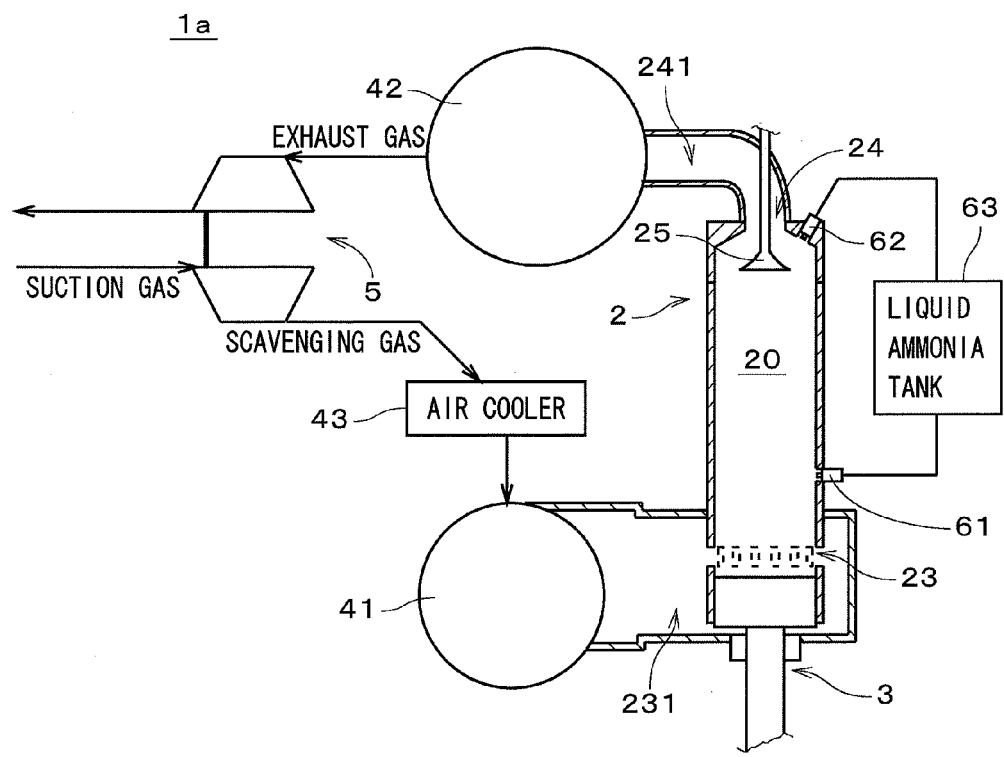
FIG. 3 illustrates another exemplary configuration of the two-stroke engine.
Figure 4:
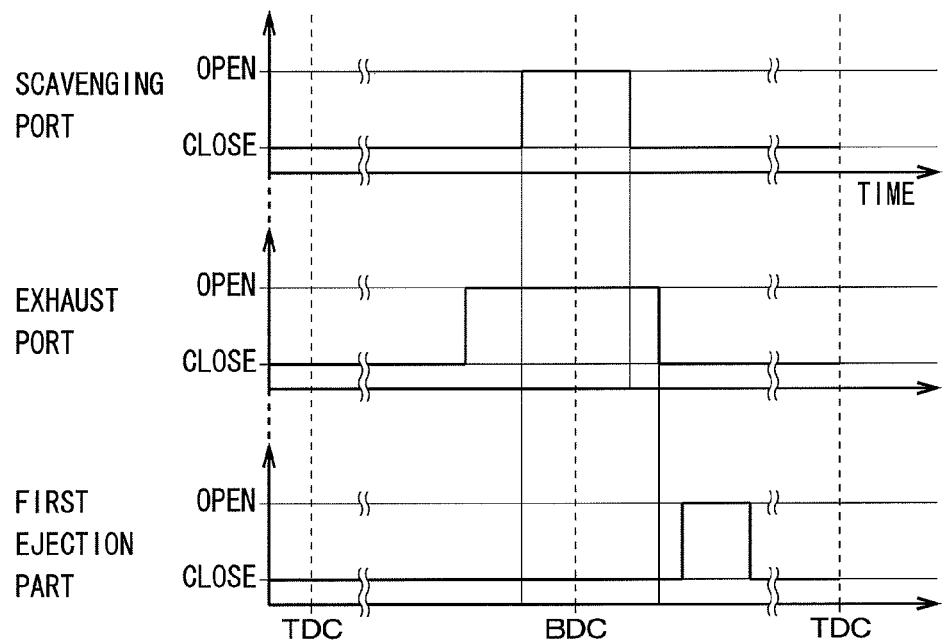
FIG. 4 is a timing chart illustrating opening and closing operations of a scavenging port, an exhaust port, and a first ejection part.

FIG. 3 illustrates another exemplary configuration of the two-stroke engine. A two-stroke engine 1a in FIG. 3 is the same as the two-stroke engine 1 in FIG. 1, with the exception that the reduction catalyst 7 is omitted. Thus, the same reference numerals are given to parts of the configuration that are the same as in FIG. 1. FIG. 4 is a timing chart illustrating opening and closing operations of a scavenging port 23, an exhaust port 24, and a first ejection part 61 of the two-stroke engine 1a.

In the present example of operations, the timing of the opening and closing operations of the scavenging port 23 and the exhaust port 24 is the same as that in the example of operations in FIG. 2, but the timing of the opening and closing operations of the first ejection part 61 differs from that in FIG. 2. Specifically, after the piston 3 has moved upward from the bottom dead center and the scavenging port 23 and the exhaust port 24 are closed in order (see the upper and middle sections in FIG. 4), the first ejection part 61 is opened as shown in the lower section in FIG. 4 to eject liquid ammonia into the combustion chamber 20 for a fixed period of time. In this case, the scavenging gas within the combustion chamber 20 is cooled in a state in which the combustion chamber 20 is sealed. Then, when the piston 3 has reached in the vicinity of the top dead center, the second ejection part 62 ejects liquid ammonia into the combustion chamber 20, causing combustion in the combustion chamber 20. At this time, in two-stroke engine 1a, substantially the entire amount of ammonia gas within the combustion chamber 20 burns.

As described above, in the two-stroke engine 1a, the first ejection part 61 ejects liquid ammonia into the combustion chamber 20 only within the period of time after the exhaust port 24 is closed until when the piston 3 next reaches the top dead center, and the scavenging gas within the combustion chamber 20 is cooled. This prevents the two-stroke engine 1a without the reduction catalyst 7 from encountering a situation in which the vaporized gas of liquid ammonia ejected from the first ejection part 61 is exhausted from the combustion chamber 20 before burning in the combustion chamber 20 (i.e., prevents the ammonia gas from passing through the combustion chamber 20). As a result, it is possible to prevent the ammonia gas from being exhausted out of the two-stroke engine 1a and to reduce the amount of compression work in the two-stroke engine 1a by cooling the scavenging gas within the combustion chamber 20.

Note that with a two-stroke engine with a reduction catalyst, the passing of the ammonia gas through the combustion chamber 20 may be prevented by the first ejection part 61 ejecting liquid ammonia only after the exhaust port 24 is closed. In this case, a supply part for supplying ammonia or another reducing agent to the reduction catalyst is separately provided.

Figure 5:
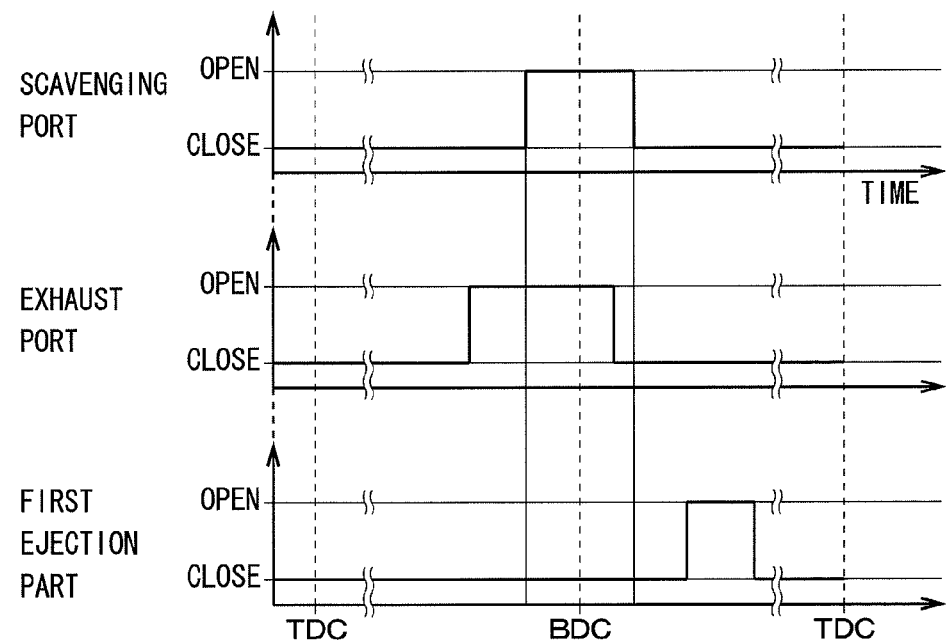
FIG. 5 is a timing chart illustrating opening and closing operations of the scavenging port, the exhaust port, and the first ejection part.

Next, another example of operations of the two-stroke engine 1a in FIG. 3 will be described. FIG. 5 is a timing chart illustrating opening and closing operations of the scavenging port 23, the exhaust port 24, and the first ejection part 61 according to the other example of operations.

In the present example of operations, the timing of the opening and closing operations of the scavenging port 23 and the first ejection part 61 is the same as that in the example of operations in FIG. 4, but the timing of the opening and closing operations of the exhaust port 24 differs from that in FIG. 4. Specifically, as shown in the upper and middle sections in FIG. 5, after the piston 3 has passed through the bottom dead center, the exhaust port 24 is closed before the scavenging port 23. At this time, in the two-stroke engine 1a, part of high-temperature burnt gas remains as residual gas in the combustion chamber 20. After the scavenging port 23 is closed, the first ejection part 61 ejects liquid ammonia into the combustion chamber 20 for a fixed period of time as shown in the lower section in FIG. 5, and the gas including the scavenging gas and the residual gas within the combustion chamber 20 is cooled by the heat of vaporization of the liquid ammonia. Then, when the piston 3 reaches in the vicinity of the top dead center, the second ejection part 62 ejects liquid ammonia into the combustion chamber 20, causing combustion in the combustion chamber 20.

As described above, in the two-stroke engine 1a, part of the burnt gas remains as residual gas in the combustion chamber 20 when the exhaust port 24 is closed, and liquid ammonia is ejected into the combustion chamber 20 containing the scavenging gas and the residual gas by the first ejection part 61 after the exhaust port 24 is closed. It is thus possible to reduce the temperature of the gas in the combustion chamber 20 and to reduce the pressure in the combustion chamber 20 during compression while reducing the heat load on the cylinder 2. It is also possible to reduce the amount of oxygen in the gas contained in the combustion chamber 20 during combustion. Consequently, nitrogen oxide in the exhaust gas can be reduced while reducing the amount of compression work.

The two-stroke engine 1a according to the present example of operations prevents the passing of ammonia gas through the combustion chamber because the first ejection part 61 ejects liquid ammonia only after the exhaust port 24 is closed. Alternatively, in the case where a reduction catalyst 7 is provided as in the two-stroke engine 1 in FIG. 1, the first ejection part 61 may also eject liquid ammonia before the exhaust port 24 is closed.

Figure 6:
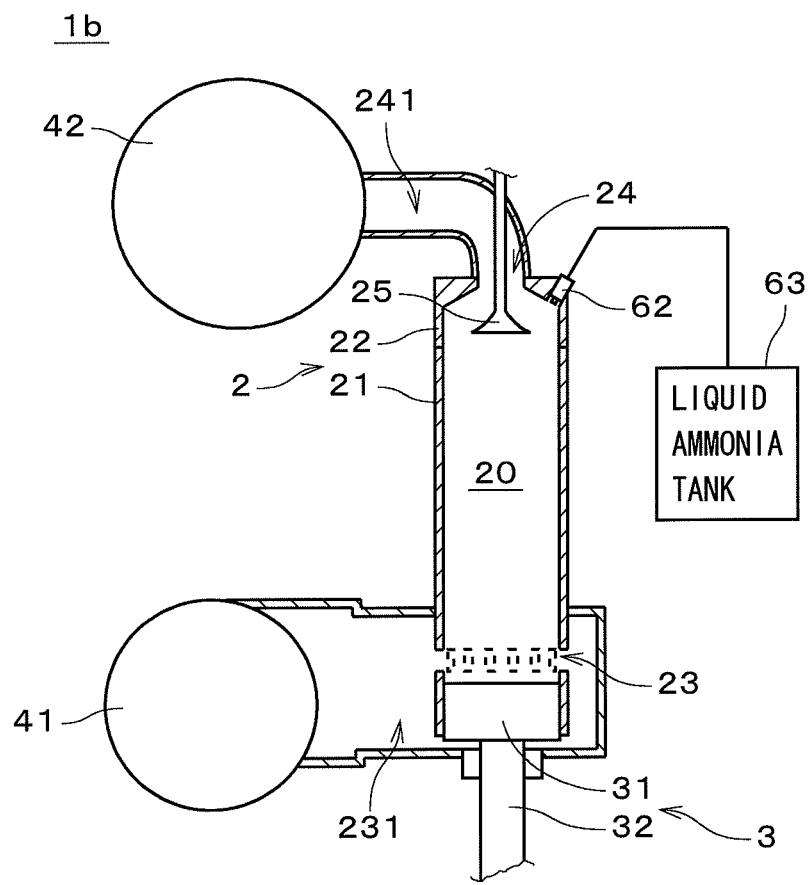
FIG. 6 illustrates yet another exemplary configuration of the two-stroke engine.

FIG. 6 illustrates yet another exemplary configuration of the two-stroke engine. In FIG. 6, only part of the configuration of a two-stroke engine 1b is illustrated. The two-stroke engine 1b in FIG. 6 is the same as the two-stroke engine 1 in FIG. 1, with the exception that the first ejection part 61 is omitted. Thus, the same reference numerals are given to parts of the configuration that are the same as in FIG. 1.

In the two-stroke engine 1b in FIG. 6, the ejection of liquid ammonia into the combustion chamber 20 by the first ejection part 61 in FIG. 1 is realized by a second ejection part 62. Specifically, after the supply of the scavenging gas through the scavenging port 23 into the combustion chamber 20 is started, the second ejection part 62 provided in the cylinder cover 22 ejects liquid ammonia into the combustion chamber 20 before the piston 3 next reaches the top dead center.

Here, if an ejection part for ejecting liquid ammonia for cooling the scavenging gas is disposed in the cylinder liner 21 (i.e., the side portion of the cylinder 2), the ejection part cannot eject liquid ammonia into the combustion chamber 20 when the upper surface of the piston crown 31 is positioned above that ejection part. This considerably limits the length of time during which liquid ammonia for cooling the scavenging gas can be ejected.

In contrast, in the two-stroke engine 1b in FIG. 6, an ejection part for ejecting liquid ammonia for cooling the scavenging gas (i.e., the second ejection part 62) is disposed in the cylinder cover 22 and always faces the combustion chamber 20. This increases the degree of freedom in the timing of ejection of liquid ammonia for cooling the scavenging gas. In addition, in the two-stroke engine 1b in FIG. 6, one ejection part serves as both the ejection part for ejecting liquid ammonia into the combustion chamber 20 and causing combustion in the combustion chamber 20 and the ejection part for ejecting liquid ammonia for cooling the scavenging gas. In other words, the ejection part for cooling the scavenging gas serves also as the other ejection part. Thus, the configuration of the two-stroke engine can be simplified.

Figure 7:
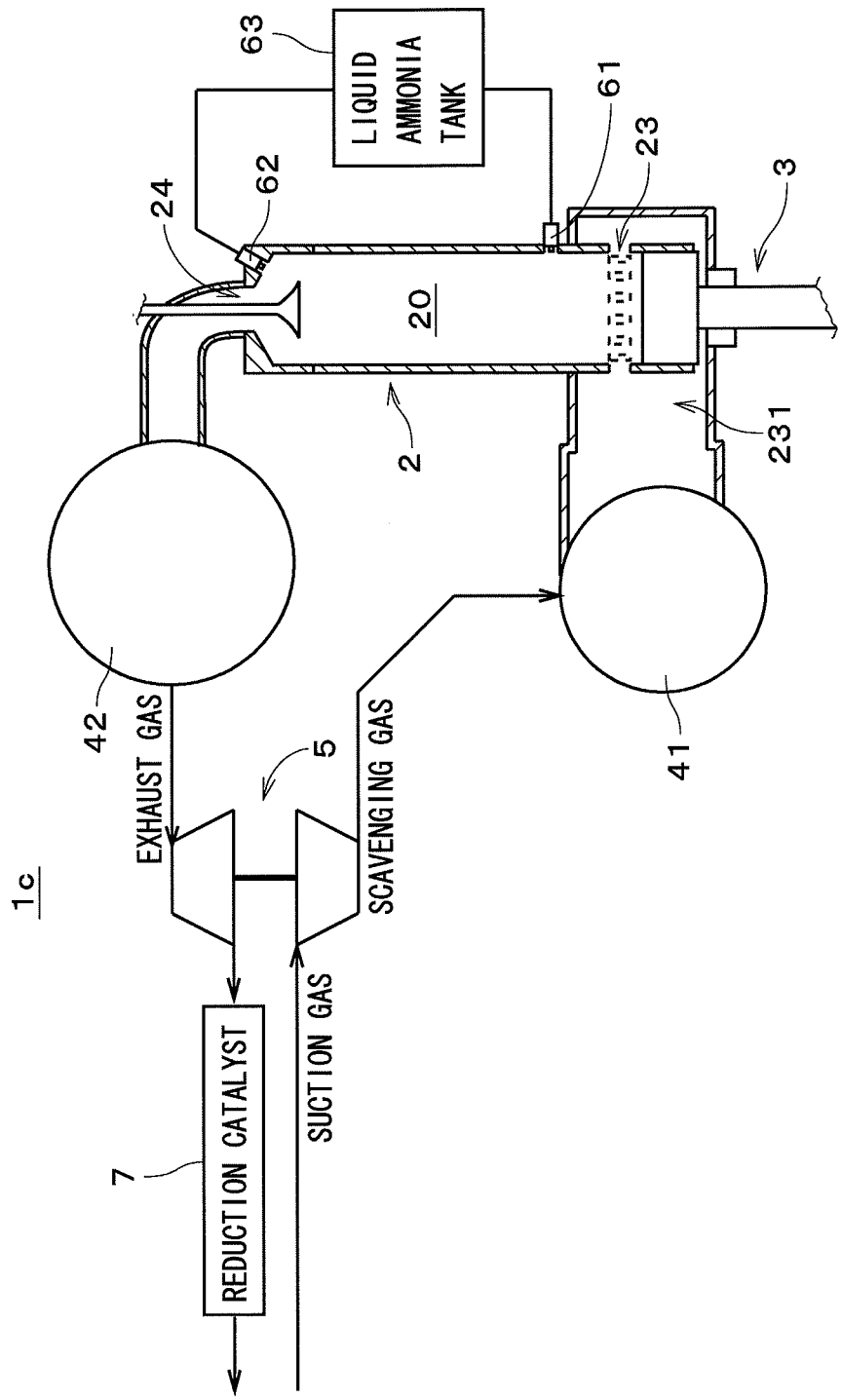
FIG. 7 illustrates yet another exemplary configuration of the two-stroke engine.

The two-stroke engines 1, 1a, and 1b in FIGS. 1, 3, and 6 can cool the scavenging gas within the combustion chamber 20 by the ejection of liquid ammonia for cooling the scavenging gas. Thus, the air cooler 43 can be made compact. Depending on the design of a two-stroke engine, it is possible to omit an air cooler between the supercharger 5 and the scavenging pipe 41 as in a two-stroke engine 1c illustrated in FIG. 7. In the two-stroke engine 1c in FIG. 7, the scavenging gas is supplied from the supercharger 5 to a scavenging port 23 through a scavenging pipe 41 and a scavenging chamber 231 without being cooled by a cooling medium (i.e., a heating medium for reducing the temperature of the scavenging gas). Thus, in the two-stroke engine 1c where an air cooler is omitted, the engine configuration can be simplified (the same applies to a four-stroke engine 1d in FIG. 8, which will be described later).

Figure 8:
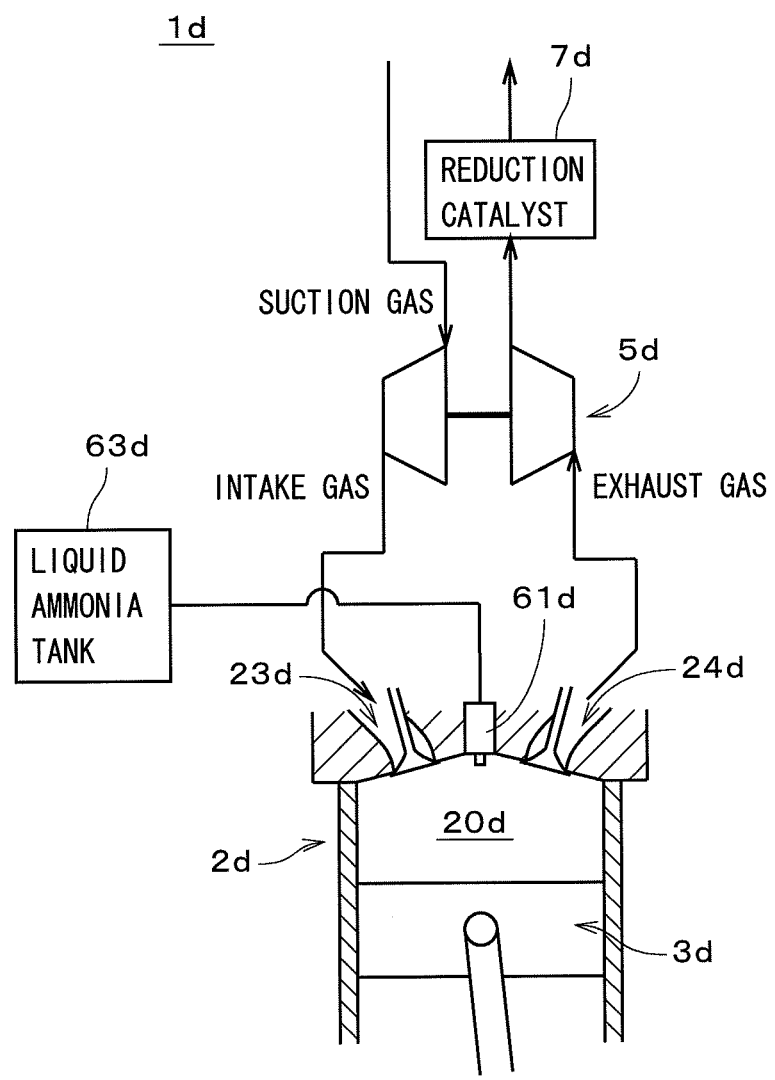
FIG. 8 illustrates a configuration of a four-stroke engine according to a second embodiment.

FIG. 8 illustrates a configuration of a four-stroke engine 1d according to a second embodiment of the present invention. The four-stroke engine 1d in FIG. 8 includes a cylinder 2d, a piston 3d provided in the cylinder 2d, an intake port 23d and an exhaust port 24d that are formed in the cylinder 2d, an ejection part 61d connected to a liquid ammonia tank 63d, and a supercharger 5d for pressurizing a suction gas to generate an intake gas.

In the four-stroke engine 1d, the intake gas from the supercharger 5d is supplied into a combustion chamber 20d, which is a space enclosed by the cylinder 2d and the upper surface of the piston 3d, by opening a valve provided in the intake port 23d in an intake stroke in which the piston 3d moves from the top dead center to the bottom dead center. Then, a compression stroke is performed with the intake port 23d closed in which the intake gas in the combustion chamber 20d is compressed by the piston 3d moving from the bottom dead center to the top dead center. In actuality, the ejection part 61d ejects liquid ammonia into the combustion chamber 20d within a period of time from when the supply of the intake gas through the intake port 23d into the combustion chamber 20d is started in the immediately previous intake stroke until when the piston 3d reaches the top dead center in the compression stroke. Through this, the intake gas in the combustion chamber 20d is cooled by the heat of vaporization of the liquid ammonia.

When the piston 3d is positioned in the vicinity of the top dead center, the ejection part 61d again ejects liquid ammonia into the combustion chamber 20d and causes combustion of gas including ammonia and the intake gas in the combustion chamber 20d. After an expansion stroke in which the piston 3d moves from the top dead center to the bottom dead center due to the combustion of gas in the combustion chamber 20d, an exhaust stroke is performed in which the piston 3d moves from the bottom dead center to the top dead center. In the exhaust stroke, the valve provided in the exhaust port 24d is opened to exhaust the gas within the combustion chamber 20d out of the combustion chamber 20d. The exhaust gas exhausted out of the cylinder 2d is guided via the supercharger 5d to a reduction catalyst 7d, and nitrogen oxide in the exhaust gas is reduced with the reduction catalyst 7d and ammonia gas that is separately supplied to the reduction catalyst 7d.

As described above, in the four-stroke engine 1d in FIG. 8, the ejection part 61d ejects liquid ammonia into the combustion chamber 20d within a period of time from when the supply of the intake gas through the intake port 23d into the combustion chamber 20d is started until when the piston 3d reaches the top dead center in the compression stroke (i.e., until when the compression stroke is completed). It is thus possible in the four-stroke engine 1d to reduce the temperature of the gas (mainly the intake gas) in the combustion chamber 20d by the heat of vaporization of the liquid ammonia, reduce the pressure in the combustion chamber 20d in a compression stroke, and reduce the amount of compression work. Consequently, the four-stroke engine 1d can achieve improved energy efficiency.

In the four-stroke engine 1d in FIG. 8, another ejection part for ejecting liquid ammonia for cooling the intake gas may be provided separately from the ejection part 61d. In this case, the other ejection part may be provided in a side portion of the cylinder 2d as in the two-stroke engines 1, 1a, and 1c in FIGS. 1, 3, and 7.

Alternatively, in the four-stroke engine 1d, the period of time during which the exhaust port 24d is open and the period of time during which the intake port 23d is open may overlap each other. In this case, the ejection part 61d may eject liquid ammonia into the combustion chamber 20d within a period of time during which both of the exhaust port 24d and the intake port 23d are open. This allows the ammonia gas that is used to cool the intake gas to be guided in an unburnt state to the reduction catalyst 7d and allows nitrogen oxide in the exhaust gas to be reduced with the ammonia gas and the reduction catalyst 7d.

Meanwhile, in the four-stroke engine 1d, the passing of ammonia gas through the combustion chamber 20d is prevented if the ejection part 61d ejects liquid ammonia into the combustion chamber 20d only when the exhaust port 24d is closed. In this case, part of burnt gas may remain as residual gas in the combustion chamber 20d when the exhaust port 24d is closed. This reduces nitrogen oxide in the exhaust gas.

While the above has been a description of embodiments of the present invention, the present invention is not limited to the above-described embodiments and can be modified in various ways.

In the two-stroke engines, for example, the liquid ammonia ejected from the second ejection part 62 may be mixed with petroleum fuel or the like. Alternatively, ammonia gas, mixed gas-liquid ammonia, or a mixture of such ammonia and petroleum fuel or the like may be ejected from the second ejection part 62 (the same applies to the four-stroke engine). In such two-stroke engines, the combustion of gas in the combustion chamber 20 is caused by the second ejection part 62 ejecting a fluid containing ammonia (which may be a fluid containing only ammonia) when the piston is positioned in the vicinity of the top dead center.

As another alternative, the combustion of gas in the combustion chamber 20 may be caused by the second ejection part 62 ejecting highly flammable fuel (e.g., hydrogen gas or light oil) in order to assure the combustion of ammonia gas that is filled in the combustion chamber 20 by the ejection of liquid ammonia from the first ejection part 61. As yet another alternative, the above fuel may be emitted from another ejection part different from the second ejection part 62. In this case, when the piston is positioned in the vicinity of the top dead center, the second ejection part 62 ejects liquid ammonia and the other ejection part ejects the above fuel. As described previously, the combustion of gas in the combustion chamber 20 may be caused by a spark plug or the like.

In the above-described embodiments, liquid ammonia for cooling the scavenging gas (or the intake gas) is continuously ejected through an ejection part for a fixed period of time. Alternatively, the ejection part may perform a plurality of ejection operations within the same period of time so that the combustion chamber is filled with ammonia gas while the scavenging gas in the combustion chamber is being cooled. Liquid ammonia for cooling may be ejected in a gas-liquid state mixed with air or the like.

The two-stroke engines may be configured such that an exhaust port is provided in the cylinder liner 21 (a side portion of the cylinder 2) similarly to the scavenging port 23 in FIG. 1 and is opened and closed by the movement of the piston 3. The scavenging port may be opened and closed using a value, similarly to the exhaust port 24 in FIG. 1.

The superchargers 5 and 5d may be configured to pressurize a suction gas using power obtained from a crank shaft other than using the exhaust gas from the combustion chamber.

The two-stroke engines and the four-stroke engine according to the above-described embodiments may be used in various applications aside from marine applications, such as in automobiles or prime motors for electric power generation.

The configurations of the above-described embodiments and variations may be appropriately combined as long as there are no mutual inconsistencies.

While the invention has been shown and described in detail, the foregoing description is in all aspects illustrative and not restrictive. It is therefore understood that numerous modifications and variations can be devised without departing from the scope of the invention.

REFERENCE SIGNS LIST 1, 1a to 1c Two-stroke engine
1d Four-stroke engine
2, 2d Cylinder
3, 3d Piston
5, 5d Supercharger
7, 7d Reduction catalyst
20, 20d Combustion chamber
23 Scavenging port
23d Intake port
24, 24d Exhaust port
61 First ejection part
61d Ejection part
62 Second ejection part

The invention claimed is:
1. A two-stroke engine comprising:
a cylinder;
a piston provided in said cylinder;
a supercharger for pressurizing a suction gas to generate a scavenging gas;
a scavenging port formed in said cylinder and for supplying said scavenging gas from said supercharger into a combustion chamber that is a space enclosed by said cylinder and an upper surface of said piston;
an exhaust port formed in said cylinder and for exhausting gas within said combustion chamber out of said combustion chamber; and
a liquid ammonia source and at least one ejection part for ejecting liquid ammonia from said liquid ammonia source into said combustion chamber within a period of time from when supply of said scavenging gas through said scavenging port into said combustion chamber is started until when said piston next reaches top dead center, said at least one ejection part being configured to direct said liquid ammonia so as to cool said scavenging gas; and
said at least one ejection part further ejecting fluid fuel into said combustion chamber when said piston is positioned in a vicinity of said top dead center, so as to cause said fluid fuel to ignite spontaneously in said combustion chamber, said fluid fuel containing liquid ammonia from said liquid ammonia source.

2. The two-stroke engine according to claim 1, wherein said scavenging port and said at least one ejection part are provided in a lower portion of said cylinder.

3. The two-stroke engine according to claim 1, further comprising:
a reduction catalyst for, along with ammonia gas, reducing nitrogen oxide,
wherein said reduction catalyst is provided on a path of the exhaust gas exhausted from said combustion chamber, and
said at least one ejection part ejects said liquid ammonia into said combustion chamber within a period of time during which the gas within said combustion chamber is being exhausted through said exhaust port.

4. The two-stroke engine according to claim 1, wherein said at least one ejection part ejects said liquid ammonia into said combustion chamber only after said exhaust port is closed.

5. The two-stroke engine according to claim 1, wherein a part of burnt gas remains as residual gas in said combustion chamber when said exhaust port is closed, and
said at least one ejection part ejects said liquid ammonia into said combustion chamber after said exhaust port is closed.

6. The two-stroke engine according to claim 1, wherein said at least one ejection part comprises a first and a second ejection part.

7. The two-stroke engine according to claim 1, wherein said scavenging gas is supplied from said supercharger to said scavenging port without being cooled by a cooling medium.

8. The two-stroke engine according to claim 6,
wherein said first ejection part ejects said liquid ammonia into said combustion chamber within said period of time until top dead center, said first ejection part being configured to direct said liquid ammonia so as to cool said scavenging gas; and
said second ejection part ejects said fluid fuel into said combustion chamber when said piston is positioned in a vicinity of said top dead center, so as to cause said fluid fuel to ignite spontaneously in said combustion chamber.

9. The two-stroke engine according to claim 8, wherein said first ejection part is provided in the lower portion of the cylinder.

10. The two-stroke engine according to claim 8, wherein said first ejection part ejects said liquid ammonia into said combustion chamber within a period of time during which the gas within said combustion chamber is being exhausted through said exhaust port.

11. The two-stroke engine according to claim 8, wherein said first ejection part ejects said liquid ammonia into said combustion chamber only after said exhaust port is closed.

12. The two-stroke engine according to claim 8, wherein a part of burnt gas remains as residual gas in said combustion chamber when said exhaust port is closed, and
said first ejection part ejects said liquid ammonia into said combustion chamber after said exhaust port is closed.

13. A four-stroke engine comprising:
a cylinder;
a piston provided in said cylinder;
a supercharger for pressurizing a suction gas to generate an intake gas;
an intake port formed in said cylinder and for supplying said intake gas from said supercharger into a combustion chamber in an intake stroke, said combustion chamber being a space enclosed by said cylinder and an upper surface of said piston;
a liquid ammonia source and at least one ejection part for ejecting liquid ammonia from said liquid ammonia source into said combustion chamber within a period of time from when supply of said intake gas through said intake port into said combustion chamber is started until when said piston reaches top dead center in a compression stroke, said at least one ejection part being configured to direct said liquid ammonia so as to cool said intake gas;
said at least one ejection part further ejecting, when said piston is positioned in a vicinity of said top dead center, fluid fuel into said combustion chamber, so that said fluid fuel ignites spontaneously in said combustion chamber, said fluid fuel containing liquid ammonia from said liquid ammonia source; and
an exhaust port formed in said cylinder and for exhausting gas in said combustion chamber out of said combustion chamber in an exhaust stroke performed after an expansion stroke in which the gas within said combustion chamber burns.

14. The four-stroke engine according to claim 13, further comprising:
a reduction catalyst for, along with ammonia gas, reducing nitrogen oxide,
wherein said reduction catalyst is provided on a path of the exhaust gas exhausted from said combustion chamber, and
said at least one ejection part ejects said liquid ammonia into said combustion chamber within a period of time during which the gas within said combustion chamber is being exhausted through said exhaust port.

15. The four-stroke engine according to claim 13, wherein said at least one ejection part ejects said liquid ammonia into said combustion chamber only after said exhaust port is closed.

16. The four-stroke engine according to claim 13, wherein a part of burnt gas remains as residual gas in said combustion chamber when said exhaust port is closed, and
said at least one ejection part ejects said liquid ammonia into said combustion chamber after said exhaust port is closed.

17. The four-stroke engine according to claim 13, wherein said at least one ejection part comprises a first and a second ejection part.

18. The four-stroke engine according to claim 17, wherein
wherein said first ejection part ejects said liquid ammonia into said combustion chamber within said period of time until top dead enter, said first ejection part being configured to direct said liquid ammonia so as to cool said intake gas; and
said second ejection part ejects said fluid fuel into said combustion chamber when said piston is positioned in a vicinity of said top dead center, so as to cause said fluid fuel to ignite spontaneously in said combustion chamber.

19. The four-stroke engine according to claim 18, wherein said first ejection part ejects said liquid ammonia into said combustion chamber within a period of time during which the gas within said combustion chamber is being exhausted through said exhaust port.

20. The four-stroke engine according to claim 18, wherein said first ejection part ejects said liquid ammonia into said combustion chamber only after said exhaust port is closed.

21. The four-stroke engine according to claim 18, wherein a part of burnt gas remains as residual gas in said combustion chamber when said exhaust port is closed, and
said first ejection part ejects said liquid ammonia into said combustion chamber after said exhaust port is closed.

* * * * *